Dec. 15, 1936.          R. G. DANIEL          2,064,416
VULCANIZER ADAPTER
Filed April 3, 1935          2 Sheets-Sheet 1
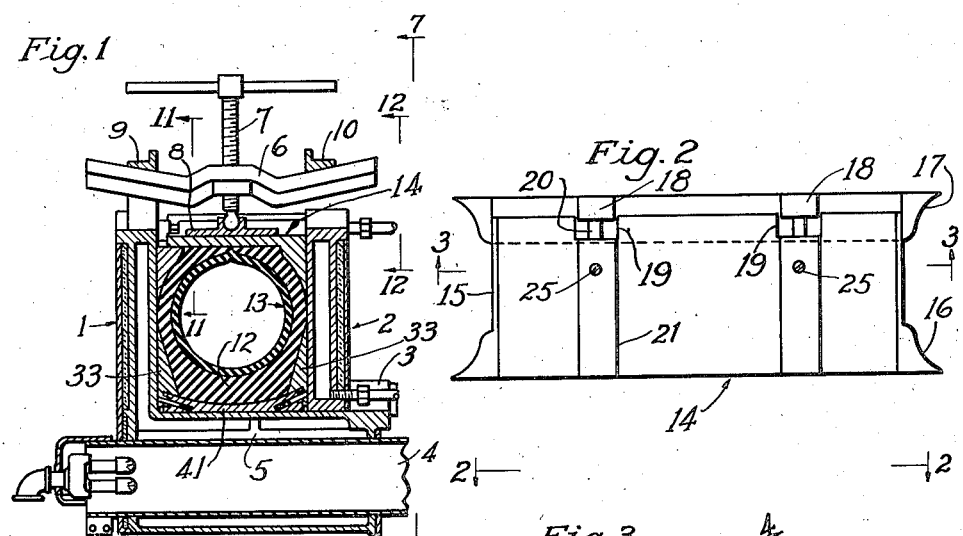
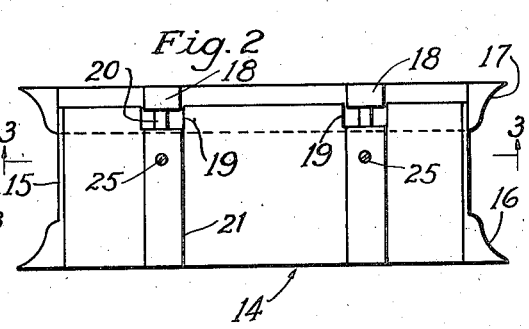
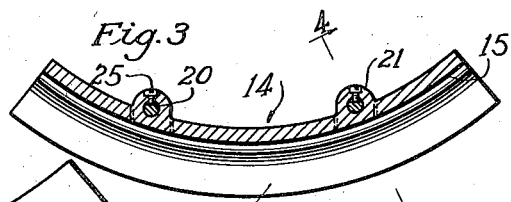
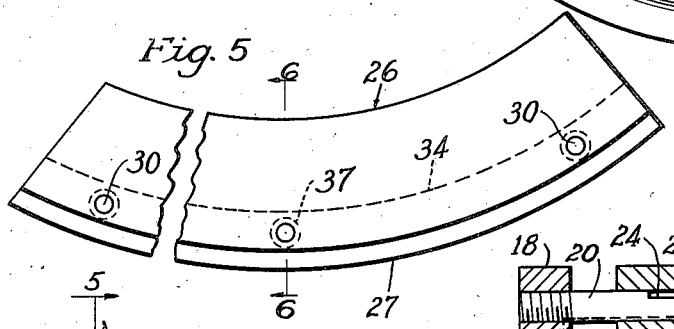
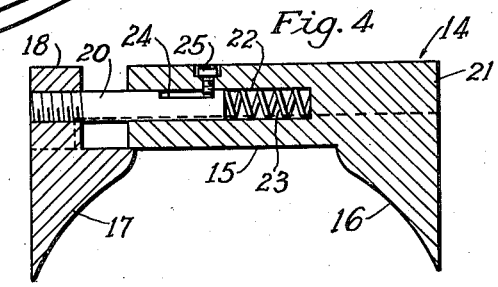
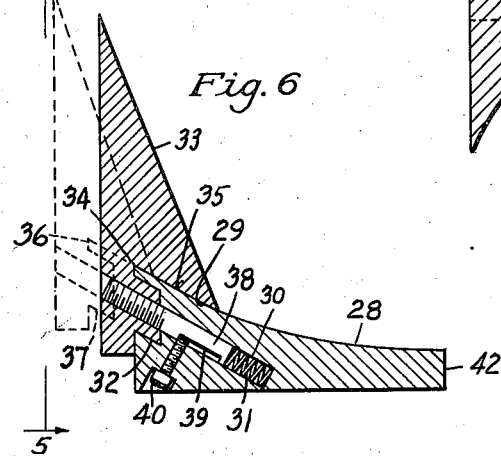
INVENTOR.
R. G. Daniel
BY Carlos G. Stratton
ATTORNEY.

Dec. 15, 1936.  R. G. DANIEL  2,064,416
VULCANIZER ADAPTER
Filed April 3, 1935   2 Sheets-Sheet 2
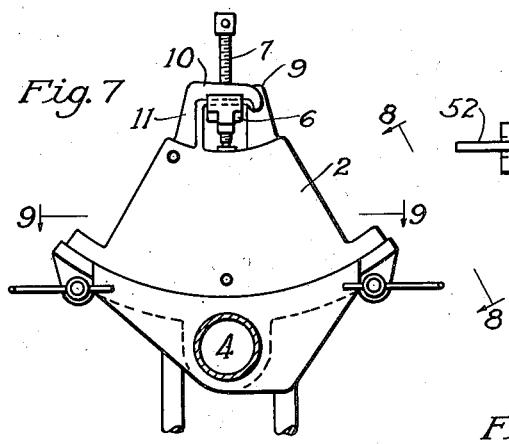
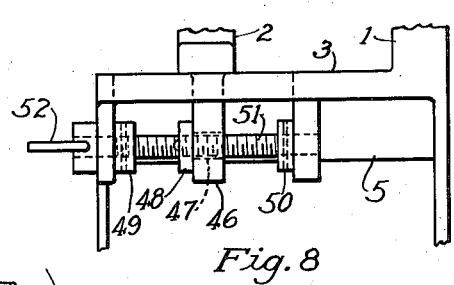
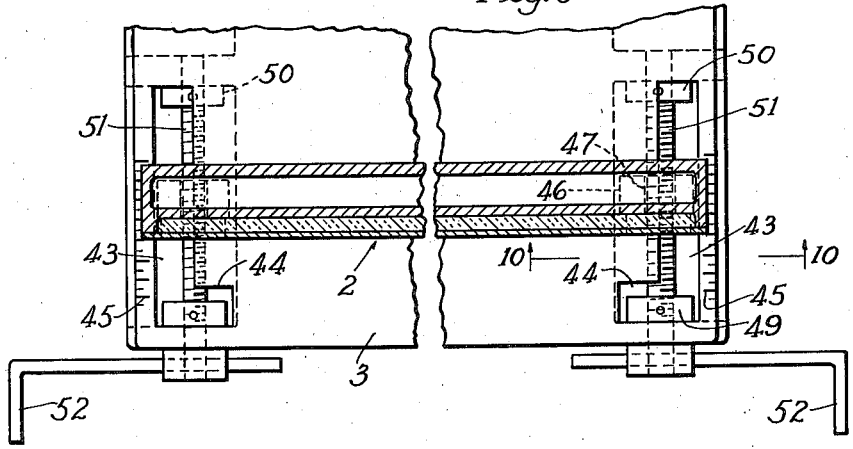
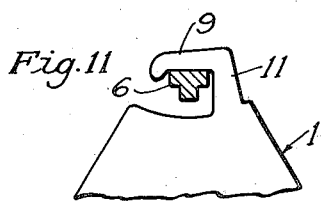
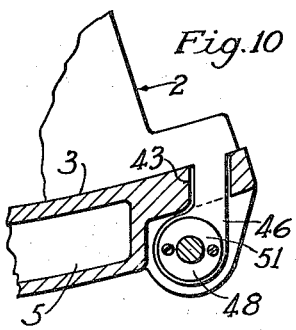
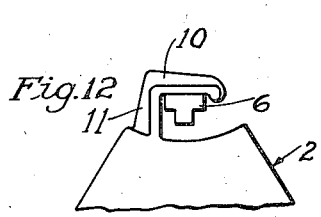
INVENTOR.
R. G. Daniel
BY Carlos G. Stratton
ATTORNEY.

Patented Dec. 15, 1936

2,064,416

UNITED STATES PATENT OFFICE 2,064,416

VULCANIZER ADAPTER

Royal G. Daniel, Beverly Hills, Calif.

Application April 3, 1935, Serial No. 14,427

12 Claims. (Cl. 18—18)

My present invention relates particularly to vulcanizer adapters and especially to extensible adapters useful in vulcanizers having a relatively movable wall.

An important object of my invention is to provide both bead and matrix or tread adapters that may be used for motor vehicle tires of different sizes.

Another object is to provide such adapters in which the adjustment is automatic when used in a vulcanizer of the character described.

A further object is to provide guides for the adapters, whereby to hold the parts thereof in their respective positions.

A still further object is to provide an adapter that will automatically cover more of the shoulder of a larger tire than of a smaller tire, whereby to better conform to different sizes of tires.

Another object is to provide an adapter of the character described having a plate member presenting an unbroken face to a tire and having a shoulder movable on the plate within the lateral extent thereof.

Many other objects reside in novel details of construction and in novel combinations and arrangements of parts, which will appear in the course of the following description.

In the drawings, like reference characters designate similar parts in the several views.

Figure 1 is a broken, vertical section of a vulcanizer embodying features of the present invention.

Figure 2 is an enlarged plan of a bead adapter.

Figure 3 is a section taken on the line 3—3 of Figure 2.

Figure 4 is a still further enlargement, taken on the line 4—4 of Figure 3.

Figure 5 is a face view of a matrix or tread adapter, taken on the line 5—5 of Figure 6.

Figure 6 is an enlarged section taken on the line 6—6 of Figure 5.

Figure 7 is an end view of the vulcanizer, taken on the line 7—7 of Figure 1.

Figure 8 is an enlarged edge view taken on the line 8—8 of Figure 7.

Figure 9 is an enlarged, broken plan, partly in section, taken on the line 9—9 of Figure 7.

Figure 10 is a broken section taken on the line 10—10 of Figure 9.

Figures 11 and 12 are fragmentary views, in section and in elevation respectively, taken on the lines 11—11 and 12—12 of Figure 1.

Referring more in detail to the drawings, the reference numeral 1 generally designates an insulated, relatively stationary wall of my vulcanizer. A relatively movable wall 2 is disposed on a bed 3 of the vulcanizer. A combustion chamber 4 is disposed in a steam boiler 5. A yoke 6 bridges the space between the walls. A jack bolt 7 mounted in the yoke carries a pressure foot 8. The features thus far, and other associated parts, are more fully shown and described in my co-pending application, Serial No. 10,600, filed March 12, 1935, to which reference is hereby made, for matter shown and described, but not claimed herein. Details of the vulcanizer per se, apart from the adapters, form no part of the present invention.

Hooks 9 and 10 are respectively disposed on the stationary and movable walls 1 and 2. The hooks point in opposite directions, as perhaps best shown in Figures 11 and 12. They point in a direction counter to the direction of rotation of the stud 7 in screwing same home, in order that upright members 11 of the hooks may oppose similar rotation of the yoke 6.

The adapters in the present invention consist of coutour plates to conform with the beads, shoulders and tread of a tire. A tire and an inserted air bag have been indicated in section at 12 and 13 respectively in the vulcanizer.

The bead adapter comprises an extensible unit indicated generally by the number 14. The unit 14 comprises a plate member 15 and an integral shoulder member 16. A relatively movable shoulder member 17 is mounted on the plate member. Said members together embrace the beads of the tire 12.

The movable shoulder 17 carries bosses 18 and the plate 15 is notched, as shown at 19, to receive the bosses 18 when the unit 14 is contracted. Pins 20 are mounted in the bosses 18. The rear face of the plate member 15, with relation to the tire-engaging face, carries ribs 21, having sockets 22 for receiving the pins 20. Springs 23 are seated in the bottoms of the sockets.

Each pin 20 has a flat side 24, adjacent to but spaced from the end of the pin and within the socket. A stop screw 25 projects from a side of the socket 22 at said flat spot of the pin, whereby to limit longitudinal movement of the pin 20.

The matrix adapter unit for the tread and tread shoulders of the tire is indicated generally by the number 26. A tread plate 27 of the unit 26 has a curved tread-engaging surface or matrix 28. Edge 29 of surface 28 is flat in cross section, and disposed at an acute angle to the longitudinal bisecting plane of the tire.

The tread plate has a socket 30. As with the bead adapter, a coil spring 31 is seated in the bottom of the socket 30. A countersink 32 is disposed around the mouth of the socket.

A shoulder plate for the unit 26 is indicated at 33. The plate 33 is longitudinally notched at 34. One surface 35 of the notch is flat in cross section, and disposed similarly to the flat surface 29, for sliding engagement of the one surface on the other.

The other surface 36 of the notch carries bosses 37, from which project pins 38. The pins are arranged parallel to the surface 35, whereby to hold the shoulder plate 33 in contact with the tread plate 28 throughout the movement of the one on the other. The pins 38 have flat sides 39 and screws 40 limit the longitudinal movement of the pins, the same as with the pins 20 in the bead adapter.

It is to be understood that a shoulder plate similar to plate 33 and its associated parts are arranged at each edge of the tread plate, as indicated in Figure 1. In the latter figure, the tread plate 41 has been shown as continuous from shoulder plate to shoulder plate, whereas with the modified construction of tread plate 28, two opposed units 26 are pinned together along edge 42 of the tread plate by any suitable means.

The full line position in Figure 6 indicates the contracted position of the shoulder plate. The broken line position in this figure shows the expanded position. It will be noted that in the expanded position, the shoulder plate 33 is higher than in the contracted position. This is due to the angular arrangement of the surface 29, upon which the shoulder plate 33 slides. This rise takes care of the progressively wider shoulders that obtain on progressively larger tires. The shoulder plates 33 at all times rest on the tread plate.

Operating mechanism for my vulcanizer has been shown on sheet 2 of the drawings. The bed 3 has L-shaped slots 43. The transverse portion of the L is indicated by the number 44. Graduations 45 are marked at either edge of the bed 3, along the slots 43, to measure the position of the movable wall 2.

The movable wall has apertured ears 46 projecting through the slots 43. The ears have non-threaded apertures 47. Tapped plates 48 are bolted to the ears. Journals 49 and 50 on the vulcanizer frame support drive screws 51, operating on the tapped plates 48. Cranks 52 operate the drive screws.

The L-shaped slots facilitate assembly of my vulcanizer. The ears 46 are first inserted through the transverse portions 44 of the slots. The drive screws are then applied.

In the operation of my invention, the matrix adapter unit 26 is placed in the bed 3 of the vulcanizer between the walls 1 and 2. The tire to be vulcanized is then placed in the matrix between the shoulder plates 33. The air bag 13 is inserted in the tire and the bead plate adapter 14 is superposed on the beads of the tire.

The movable wall 2 is then set at the desired point by turning the cranks. The desired position depends upon the size of the tire to be vulcanized. The graduations 45 indicate the appropriate point according to the tire size.

The advancing movement of the wall 2 contracts the two adapters. In each adapter, the pins on the movable shoulder are forced into their respective sockets against the action of the springs therein.

The pins guide the direction of the movement of the adapter shoulders. In the matrix adapter, the shoulder 33 moves from the broken line position toward the full line position, shown in Figure 6, as the wall 2 advances. The pins 38 guide the shoulder plates 33 downward, as shown in Figure 6.

The yoke 6 is caught under the hooks 9 and 12 and the bolt 7 screwed home. Air pressure is then admitted to the bag 13, and the heat in the chamber 4 is raised, bringing the vulcanizer walls and bed to the desired temperature.

After the vulcanization is complete, the bolt 7 is released and the yoke 6 lifted from under the hooks. The cranks 52 are then turned to release the wall 2. The coil springs in the sockets of the adapters force the shoulder plates of the adapters apart, thus automatically releasing the tire. As soon as the bead adapter is removed, the tire may be rolled or lifted from the vulcanizer.

It is to be understood that any suitable means may be mounted on the vulcanizer for holding the matrix adapters in position in the vulcanizer when the tire is being rolled or lifted out as stated. Such means are especially valuable in cases where the matrix adapters stick to the tire and it is difficult to remove said adapters from the tire while they are still hot.

Having thus described my invention, what I claim and desire to secure by Letters Patent is:

1. An extensible adapter for tire vulcanizers, comprising a plate member, a shoulder member slidable on the plate member, the plate member having an opening, a pin on the shoulder member having a sliding connection with said opening, and a stop on the plate member projecting into said opening, limiting movement of the pin, and thereby limiting movement of the shoulder member relative to the plate member.

2. An extensible adapter for tire vulcanizers, comprising a plate member, a shoulder member slidable on the plate member, the plate member having a socket, spring means in the socket, and a pin on the shoulder member disposed to slide in the socket and to bear against the spring therein.

3. An extensible adapter for tire vulcanizers, comprising a plate member having a surface inclined inwardly with respect to the axis of a tire on the plate member and disposed at an acute angle to the vertical plane of a tire normally positioned on the adapter, and a tire shoulder engaging member slidable on said surface, to engage tires of different sizes.

4. An extensible adapter for tire vulcanizers, comprising a plate member having a flat surface inclined inwardly with respect to the axis of a tire on the plate member, and a tire shoulder engaging member having a flat surface slidable on said inclined surface, to alter the amount of the plate member to engage a tire in the vulcanizer.

5. An extensible adapter for tire vulcanizers, comprising a plate member having a sliding surface inclined inwardly with respect to the axis of a tire on the plate member and having an opening, a shoulder member having angularly arranged surfaces, one of the last-mentioned surfaces being slidable on said inclined surface, and a pin on the other surface having a sliding connection with the opening in the plate member, the pin being substantially parallel with the contacting, sliding surfaces of the two members.

6. An extensible adapter for tire vulcanizers, comprising a matrix member having an opening, having a curved tire engaging surface and having a flat, sliding surface inclined inwardly with respect to the axes of a tire on the matrix member, said surfaces being substantially continuous, a shoulder member having a flat surface slidable on said inclined surface, and a pin on the shoulder member engaging the opening on the matrix member, the pin being substantially parallel with said flat portions of the two members.

7. An extensible adapter for tire vulcanizers, comprising a plate member adapted for engagement with the tread of a tire, a shoulder member traversely slidable on the plate member to and from a side wall of a tire on the plate member, the members having a projecting male connecting element and having a cooperating female opening, the projecting end of the male element being non-threaded and being freely slidable in said female opening, the member carrying the male element being slidable on the other member in the direction of the projection of the male element.

8. An extensible adapter for tire vulcanizers, comprising a plate member and a shoulder member arranged at an angle to each other to engage a tread and side wall of a tire, the members having substantially flat, mutual sliding surfaces for the sliding movement of one member on the other, the members having a projecting male connecting element and having a cooperating female opening, the projecting end of the male element being non-threaded and being freely slidable in said female opening, the male element projecting in a plane parallel with said sliding surfaces.

9. An extensible adapter for tire vulcanizers, comprising a plate member and a shoulder member arranged at an angle to each other to engage a tread and side wall of a tire, the members having inclined, mutual sliding surfaces for the sliding movement of one member on the other, the members having a projecting male connecting element and having a cooperating female opening, the male element projecting in a plane parallel with the incline of said sliding surfaces.

10. In an extensible adapter for tire vulcanizers, a plate member, shoulder members on the plate member, at least one of which shoulder members is slidable on the plate member, and means to move the sliding shoulder member toward the axis of a tire when the last mentioned shoulder member is moved away from the other shoulder member, to accommodate a larger tire.

11. An extensible adapter for a tire vulcanizer, comprising a plate member having a slot in an edge thereof, the plate member being adapted for engagement with a tire in the vulcanizer, a shoulder member being arranged to slide on the plate member and to engage a side wall of a tire in contact with the plate member, and an upstanding boss on the shoulder member slidable lengthwise in said slot, whereby the boss and slot direct the sliding movements of the shoulder member on the plate member.

12. An extensible adapter for a tire vulcanizer, comprising a plate element adapted for engagement with a tire in the vulcanizer, the plate element having a portion inclined toward the axis of a tire in the vulcanizer, a shoulder element arranged to engage a side wall of a tire that is in contact with the plate element, and a projecting member on the shoulder element, the latter element having a portion spaced sufficiently from the projecting member to slidably receive therebetween the inclined portion on the plate element.

ROYAL G. DANIEL.